US006933462B2

(12) United States Patent
Iriyama et al.

(10) Patent No.: US 6,933,462 B2
(45) Date of Patent: Aug. 23, 2005

(54) PLASMA PROCESSING APPARATUS FOR MONITORING AND STORING LIFETIME USAGE DATA OF A PLURALITY OF INTERCHANGEABLE PARTS

(75) Inventors: Takahiro Iriyama, Komatsu (JP); Yoshihiro Yamaguchi, Kaga (JP); Tetsuya Kabata, Kaga (JP)

(73) Assignee: Komatsu Industries Corporation, Tokyo (JP)

( * ) Notice: Subject to any disclaimer, the term of this patent is extended or adjusted under 35 U.S.C. 154(b) by 0 days.

(21) Appl. No.: 10/757,682

(22) Filed: Jan. 13, 2004

(65) Prior Publication Data

US 2004/0173583 A1 Sep. 9, 2004

(30) Foreign Application Priority Data

Feb. 6, 2003 (JP) ...................................... 2003-029633

(51) Int. Cl.[7] ................................................ B23K 10/00

(52) U.S. Cl. ............................ 219/121.53; 219/121.48; 219/121.52; 219/121.5; 219/75; 219/121.54

(58) Field of Search ....................... 219/121.54, 121.57, 219/121.55, 121.59, 121.48, 121.35, 130.4, 137 R, 130.32, 124.02, 121.56, 121.5

(56) References Cited

U.S. PATENT DOCUMENTS

| | | | | | |
|---|---|---|---|---|---|
| 4,987,285 | A | * | 1/1991 | Dallavalle et al. | 219/121.54 |
| 5,183,990 | A | * | 2/1993 | Enyedy | 219/121.54 |
| 5,514,846 | A | * | 5/1996 | Cecil et al. | 219/110 |
| 5,717,187 | A | * | 2/1998 | Rogozinski et al. | 219/121.54 |
| 5,844,196 | A | * | 12/1998 | Oakley | 219/121.54 |

FOREIGN PATENT DOCUMENTS

| | | | |
|---|---|---|---|
| JP | 2-6070 | A | 1/1990 |
| JP | 5-245645 | A | 9/1993 |
| JP | 2611337 | B2 | 2/1997 |
| JP | 9-216066 | A | 8/1997 |

* cited by examiner

*Primary Examiner*—Mark Paschall
(74) *Attorney, Agent, or Firm*—Frishauf, Holtz, Goodman & Chick, P.C.

(57) ABSTRACT

A plasma processing apparatus capable of making an accurate lifetime assessment for each of plural consumable parts (the definition of "the consumable part" is an electrode and/or a nozzle) so that effective use of the consumable parts becomes possible leading to reduced running cost. In the plasma processing apparatus, a plasma arc is generated from a plasma torch composed of an electrode and a nozzle to perform plasma work on a workpiece. Such a plasma processing apparatus includes a plurality of consumable parts, each consumable part being an electrode and/or a nozzle, and further comprises a memory for storing consumption data on every consumable part, the consumption data being used for calculation of consumption; and a display unit for displaying consumption calculated by a CPU for selecting the consumption data corresponding to a consumable part in use.

12 Claims, 4 Drawing Sheets

PLASMA PROCESSING APPARATUS FOR MONITORING AND STORING LIFETIME USAGE DATA OF A PLURALITY OF INTERCHANGEABLE PARTS

TECHNICAL FIELD

The present invention relates to a plasma processing apparatus for cutting a workpiece by melting or welding a workpiece, by use of a plasma arc generated from a plasma torch, and more particularly to a plasma processing apparatus capable of lifetime management of consumable parts such as the electrode and nozzle of the plasma torch.

BACKGROUND ART

In plasma arc cutting machines for example, which are a kind of plasma processing apparatus, cutting is done by supplying a high-temperature, high-velocity plasma jet from a plasma torch to a workpiece (an object material) to melt a localized area of the workpiece and blowing the molten portion off. During the cutting operation, a pilot arc is generated between the electrode and the nozzle within the plasma torch while feeding plasma gas to the plasma torch, and then a main arc is established between the electrode and the workpiece, initiated by the pilot arc, thereby forming a high-temperature plasma arc. This plasma arc is narrowed down by the nozzle of the plasma torch, so that the plasma jet (a high temperature, high-velocity jet stream) suited for the cutting operation can be obtained.

Owing to the influence of the high-temperature plasma and arc discharging, the electrode and nozzle within the plasma torch are consumed each time cutting is done and arc generation occurs, and finally, the generation of the plasma arc is hindered and the cutting quality deteriorates. Therefore, replacement in proper timing is necessary. The electrode and nozzle (hereinafter referred to as "consumable part") are able to serve several hundreds of cutting operations and their duration is several hours (cutting time). They require replacement about once or twice during 24-hour operation and it is still the case that the timing for the replacement is dependent on the operator's experimental judgment.

It sometimes happens due to overlooking caused by the operator's lack of experience or negligence that the consumable part is still used even though its lifetime has already expired. This leads to such a problem as cutting defects or damage to the torch. On the other hand, if the consumable part is replaced too early in advance of the expiration of the lifetime, cutting defects and damage to the torch can be avoided but the expensive consumable part will be wasted, resulting in increased running cost. To solve this, there have been previously proposed various techniques associated with lifetime management with a view to effective use of the consumable part.

For example, Japanese Patent No. 2611337 has proposed a technique associated with a lifetime judgment circuit in which the consumption of the consumable part is estimated by processing and accumulating detected data on the number of arcing events, arcing time and arc current by use of specified arithmetic expressions, and based on the result of a comparison between an estimated consumption value and an allowable consumption value, warning, suspension of the operation, or displaying of a remaining service time ratio is effected. Japanese Patent Kokai Publication No. 5-245645 discloses a technical concept that is basically the same as that of Japanese Patent No. 2611337 in that expended processing time is accumulated to be compared to an output from a setting circuit and that parameters are selected with processing current set as a variable. In addition, Japanese Patent Kokai Publication No. 9-216066 discloses a technique in which the lifetime of the consumable part is determined by measuring the temperature of cooling water which rises as the electrode is consumed.

In a typical plasma arc cutting machine, the value of arc current is changed according to the thickness of a workpiece to be cut, and the nozzle and the electrode are replaced according to the value of arc current. The reason for replacing the nozzle and the electrode in accordance with the value of arc current is that there are an optimum nozzle and electrode for each arc current value, which have good lifetimes (durability) and provide good cutting quality. The consumable part is sometimes replaced before expiration of its lifetime in other occasions than the case described above. These occasions are when highly-accurate cutting quality is required and when the lifetime of the consumable part is likely to expire in the course of cutting operation. To cope with such situations, a plurality of consumable parts are selectively properly used, when performing cutting operation with a plasma arc cutting machine.

The technique disclosed in Japanese Patent No. 2611337, however, is designed to include a lifetime judgment circuit for a single consumable part. Therefore, when applied to a case where a plurality of consumable parts are selectively used as described earlier, it cannot perform data management nor arithmetic operations on every consumable part, proving to be unsuccessful in accurate lifetime assessments of a plurality of consumable parts. The techniques disclosed in Japanese Patent Kokai Publications No. 5-245645 and No. 9-216066 are also intended to make an accurate lifetime assessment for a single consumable part only and therefore suffer from the same problem as that of Japanese Patent No. 2611337.

The present invention is directed to overcoming the foregoing shortcomings and a primary object of the invention is therefore to provide a plasma processing apparatus capable of making an accurate lifetime assessment for each of plural consumable parts so that effective use of the consumable parts becomes possible contributing to a saving in the running cost.

DISCLOSURE OF THE INVENTION

The above object can be accomplished by a plasma processing, apparatus according to the invention, wherein a plasma arc is generated from a plasma torch composed of an electrode and a nozzle to perform plasma work on a workpiece and which is equipped with a plurality of consumable parts, the definition of the consumable part being an electrode and/or a nozzle, the apparatus comprising:

(a) memory means for storing consumption data on every consumable part, the consumption data being used for calculation of consumption;

(b) selecting means for selecting the consumption data corresponding to a consumable part in use;

(c) computing means for calculating consumption based on the consumption data selected by the selecting means; and (d) displaying means for displaying the consumption calculated by the computing means.

According to the invention, the selecting means selects the consumption data corresponding to a consumable part in use from consumption data on a plurality of consumable parts stored in the memory means, and based on the consumption data selected by the selecting means, consumption is calculated by the computing means and the result of the calculation is displayed by the displaying means. With this arrangement, an accurate lifetime assessment can be made for each of the plural consumable parts so that effective use of each consumable part becomes possible. Accordingly, this has the effect of curtailing the running cost.

The plasma processing apparatus of the invention is preferably provided with warning means for raising an alarm if the consumption calculated by the computing means reaches a preset consumption value. With this arrangement, the operator (supervisor) can be informed without fail that the lifetime of a consumable part has been expired, whereby cutting defects or damage to the torch attributable to the operator's negligence can be prevented without fail.

In addition, the plasma processing apparatus of the invention is preferably provided with operation stopping means for stopping the operation of the plasma processing apparatus upon completion of a processing operation if the consumption calculated by the computing means reaches the preset consumption value. By thus stopping the operation at the time of completion of one cycle of plasma processing operation composed of pilot arc generation, transfer to a main arc, plasma work, and plasma arc extinguishment, the workpiece being processed can be prevented from becoming defective without fail.

The consumption data may include some or all of data consisting of the number of arcing events, arcing time and arc current.

The selecting means is preferably designed to specify a consumable part to be used by referring to processing data input to the memory means. This advantageously automates the lifetime management and saves the operator's (supervisor's) energy.

BEST MODE FOR CARRYING OUT THE INVENTION

Referring now to the accompanying drawings, a plasma processing apparatus will be concretely described according to a preferred embodiment of the invention. It should be noted that the following embodiment is discussed with a case where the invention is applied to a plasma arc cutting machine that is a kind of plasma processing apparatus.

Figure 1:
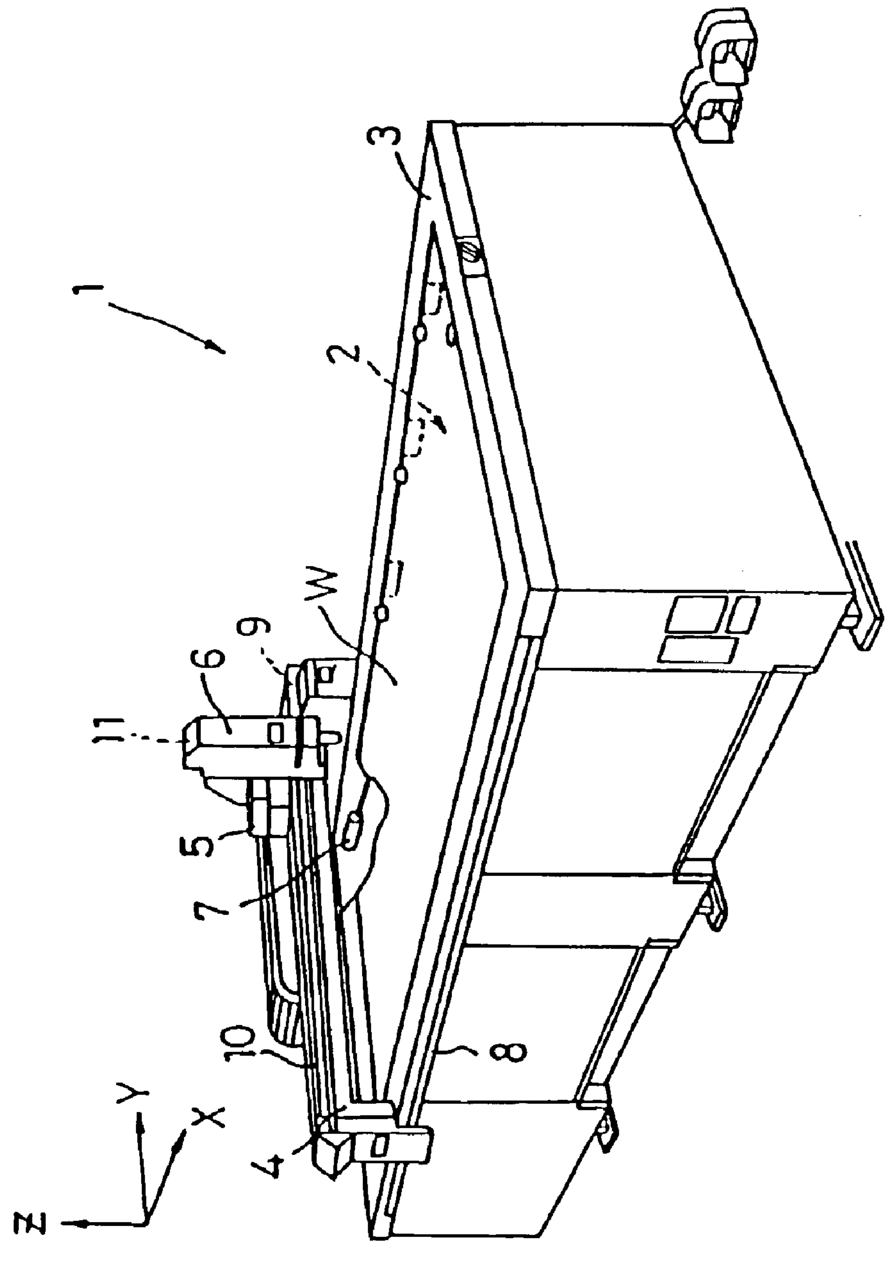
FIG. 1 is a general perspective view of a plasma arc cutting machine according to one embodiment of the invention.
Figure 2:
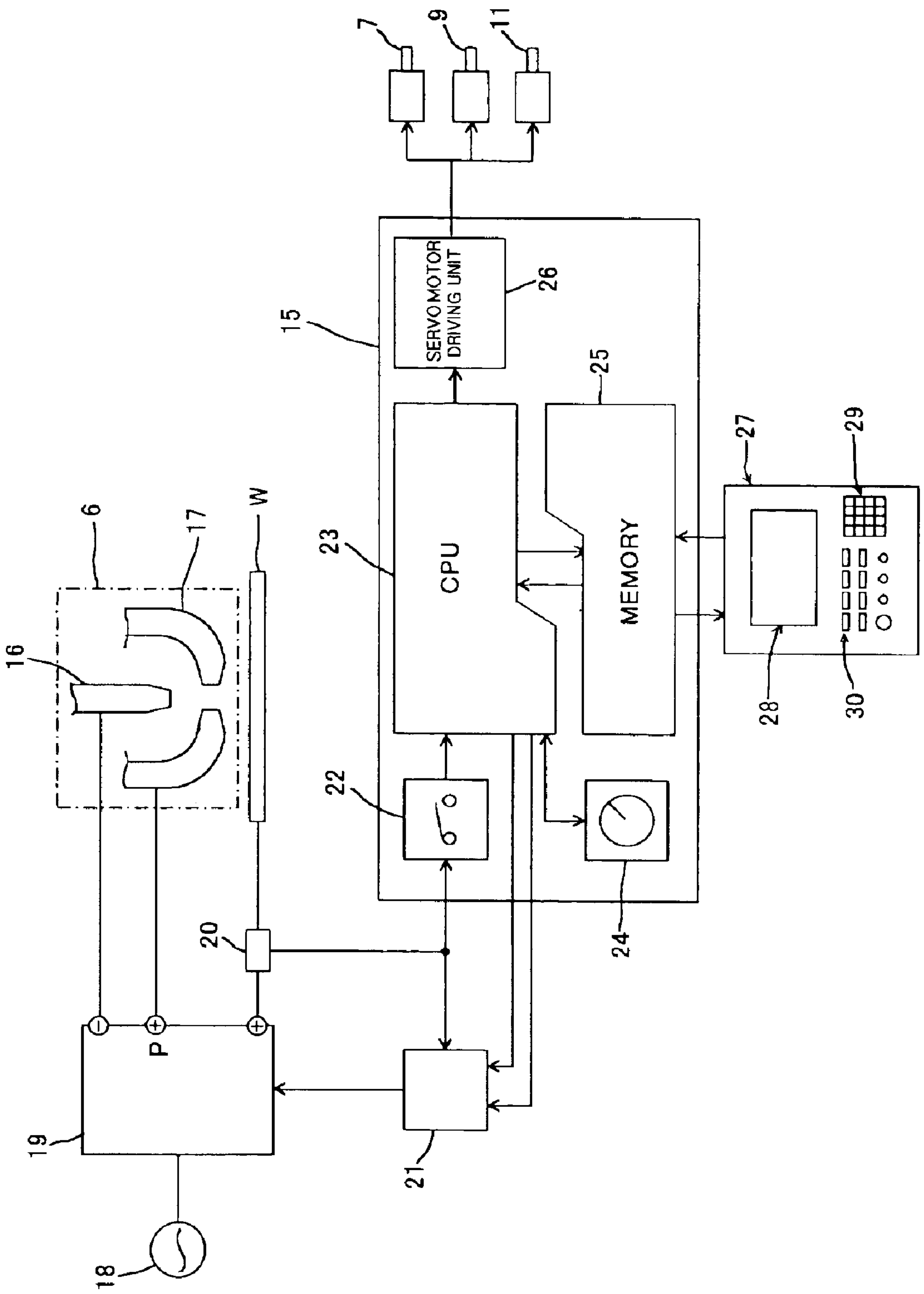
FIG. 2 is a schematic system structural diagram of the plasma arc cutting machine according to the embodiment.

FIG. 1 shows a general perspective view of the plasma arc cutting machine according to the embodiment of the invention. FIG. 2 is a schematic system structural diagram of the plasma arc cutting machine according to the embodiment.

A plasma arc cutting machine 1 according to this embodiment includes a machine body shown in the perspective view of FIG. 1 and an NC (numerical control) unit 15 (See FIG. 2) that is not shown in FIG. 1. In the machine body, a cutting platen (cutting table) 2 for supporting a steel plate W (an object material) is disposed in the space enclosed by a rectangular frame 3 and a portal traveling beam 4 is disposed so as to stride the frame 3. Disposed on the traveling beam 4 is a carriage 5 on which a plasma torch 6 is mounted. Herein, the traveling beam 4 is movable by operation of an X-axis motor 7 in the direction of the X-axis along an X-axis rail 8 which extends in a longitudinal direction (i.e., the X-axis direction) of the frame 3. The carriage 5 is movable by operation of a Y-axis motor 9 in the direction of the Y axis along a Y-axis rail 10 laid on the traveling beam 4. The plasma torch 6 is movable by operation of a Z-axis motor 11 in a vertical direction (i.e., the Z-axis direction) relative to the carriage 5. By controlling each motor (servo motor) 7, 9, 11 with the NC unit 15, the plasma torch 6 is moved to a desired position of the steel plate W and positioned at a desired level to cut the steel plate W.

As shown in FIG. 2, the plasma torch 6 comprises an electrode 16 and a nozzle 17. While a plasma gas being jetted from the nozzle 17, a pilot arc is generated between the electrode 16 and the nozzle 17 and grown into a main arc between the electrode 16 and the steel plate W, thereby establishing a high-temperature plasma arc. This plasma arc is narrowed down by the nozzle 17 to emit a plasma jet (a high-temperature high-velocity jet stream) suited for use in cutting operation. The electrode 16 is connected to a minus terminal of a power unit for plasma work 19 (hereinafter referred to as "power unit 19") which is supplied with electric power from an a.c. power supply 18. The power unit 19 is provided with a plus terminal for outputting a pilot current which is connected to the nozzle 17 and a plus terminal for outputting a main current which is connected to the steel plate W. Interposed in a line for supplying the main current is a processing current detector 20 for detecting the output of arc current.

Input to a constant current control circuit 21 for adjusting the output of the power unit 19 are a start-up signal and set current value signal sent from the NC unit 15. In this embodiment, the output currents of the power unit 19 are controlled by the constant current control circuit 21 such that the difference between a detected value obtained by the processing current detector 20 and a set current value instructed by the NC unit 15 becomes zero. While the start-up signal from the NC unit 15 being input to the constant current control circuit 21, the power unit 19 outputs a current in compliance with the set current value from the NC unit 15. After the arc current has been detected by the processing current detector 20, in other words, after the plasma arc (main arc) has been generated, a current detector switch 22 provided for the NC unit 15 is turned ON and the ON signal indicative of turning ON of the switch 22 is input to a central processing unit 23 (described later) so that it is detected that the arc current (main current) has flown into the electrode 16. The NC unit 15 is equipped with a timer 24 for measuring arcing time during one cycle of processing. It should be noted that the pilot current circuit is shut off immediately after detection of the main current.

The NC unit 15 is comprised of a memory (memory means) 25, a CPU (selecting means) 23, a servo motor driving unit 26 and others. The NC unit 15 is provided with an operating panel 27 functioning as an input-output device for the NC unit 15. The operating panel 27 includes a display unit (CRT or LCD) 28 for displaying the content of the memory 25 and various conditions; input keys 29; selector keys 30; and others. Based on an NC program, processing information and others stored in the memory 25, a positional command calculated by the CPU 23 is transmitted to the axis servo motors 7, 9, 11 through the servo motor driving unit 26 and the plasma torch 6 is moved from the present position to a target position by direct interpolation or circular interpolation.

In the operation of cutting the steel plate W with the plasma arc cutting machine 1 of the present embodiment having the above structure, the electrode 16 and the nozzle 17 within the plasma torch 6 are consumed owing to the influence of the high-temperature plasma and arc discharging each time cutting operation is performed and arc generation occurs, and finally, the generation of the plasma arc is hindered and the cutting quality deteriorates. Therefore, replacement in proper timing is necessary. In view of the fact that it is preferable to replace the electrode 16 and the nozzle 17 at the same time, a combination of the electrode 16 and the nozzle 17 is defined as "a consumable part i" to which the lifetime management is applied. In the present embodiment, a plurality of consumable parts i ($i_1$–$i_4$) as shown in Table 1 are prepared and selectively used according to the thickness etc. of the steel plate W to be cut.

TABLE 1

| | CONSUMABLE PART i | | | |
|---|---|---|---|---|
| | i1 | i2 | i3 | i4 |
| THICKNESS OF SHEET TO BE CUT (mm) | 1.2~3.2 | 3.2~6 | 4.5~12 | 9~19 |
| ARC CURRENT (CUTTING CURRENT) | 25 A | 45 A | 90 A | 120 A |
| NOZZLE (NOZZLE ORIFICE DIAMETER mm) | ϕ0.6 | ϕ0.8 | ϕ1.1 | ϕ1.3 |
| ELECTRODE | A | B | C | D |

Figure 3:
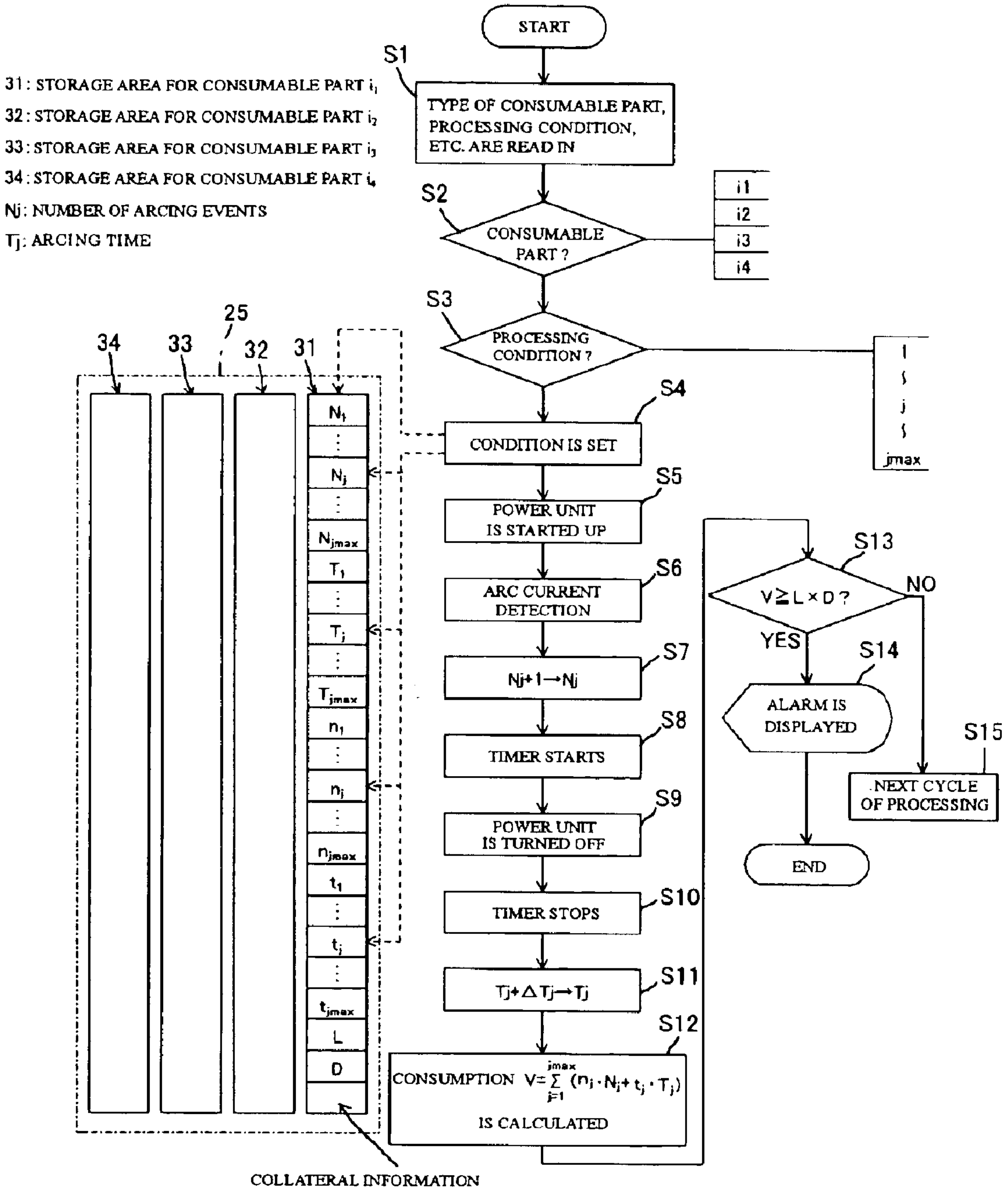
FIG. 3 is a flow chart showing the content of processing performed according to a lifetime assessment program.

In order to make an accurate lifetime assessment for each of the plural consumable parts i ($i_1$–$i_4$) which are selectively used according to the thickness etc. of the steel plate W, the memory 25 includes a storage area 31 (32, 33 or 34) for every consumable part i ($i_1$–$i_4$) (See FIG. 3). When consumption data (lifetime assessment parameters used for calculation of consumption), set lifetimes, collateral information, etc., which are associated with the consumable parts i corresponding to the storage areas 31, 32, 33 and 34, are read into the memory 25 through the input-output device (operating panel 27), these data items are recorded and stored in the specified data storing regions of the corresponding storage areas 31, 32, 33 and 34 (See FIG. 3). Data such as a type and processing condition j associated with a consumable part i ($i_1$–$i_4$) to be used are included in the NC program recorded in specified form in a recording medium such as a flexible disk or IC card. When these data items are loaded in the memory 25, the CPU 23 selects the storage area 31 (32, 33 or 34) corresponding to the consumable part $i_1$ ($i_2$, $i_3$, or $i_4$) to be used and the data stored in the data storing region for the processing condition j in the selected storage area 31 (32, 33 or 34) are selected as an operand. Examples of the consumption data (lifetime assessment parameters) include the number of arcing events, consumption per arc, arcing time, and consumption per unit of time. The collateral information is stored for the purpose of more easily carrying out the management of the consumable parts and its examples are the cumulative number of arcing events, cumulative arcing time, an estimated consumption value, the type of a nozzle, a starting date/time of use, and an alarm display usage ratio (which is a threshold for the ratio of displaying an alarm in the display unit 28 and arbitrarily set by the operator or the like).

Herein, the consumption of the consumable part i can be classified into two categories, one is associated with considerable damage caused each time an arc is generated and the other is associated with deterioration with time caused by continuous occurrence of an arc. The consumption V of the consumable part i is simply represented by:

$$V=\Sigma(nj\cdot Nj+tj\cdot Tj)$$

where the lifetime assessment parameters of the consumable part i under the processing condition j are defined such that the number of arcing events is Nj, consumption per arc is nj, arcing time is Tj and consumption per unit of arcing time is tj.

Figure 4:
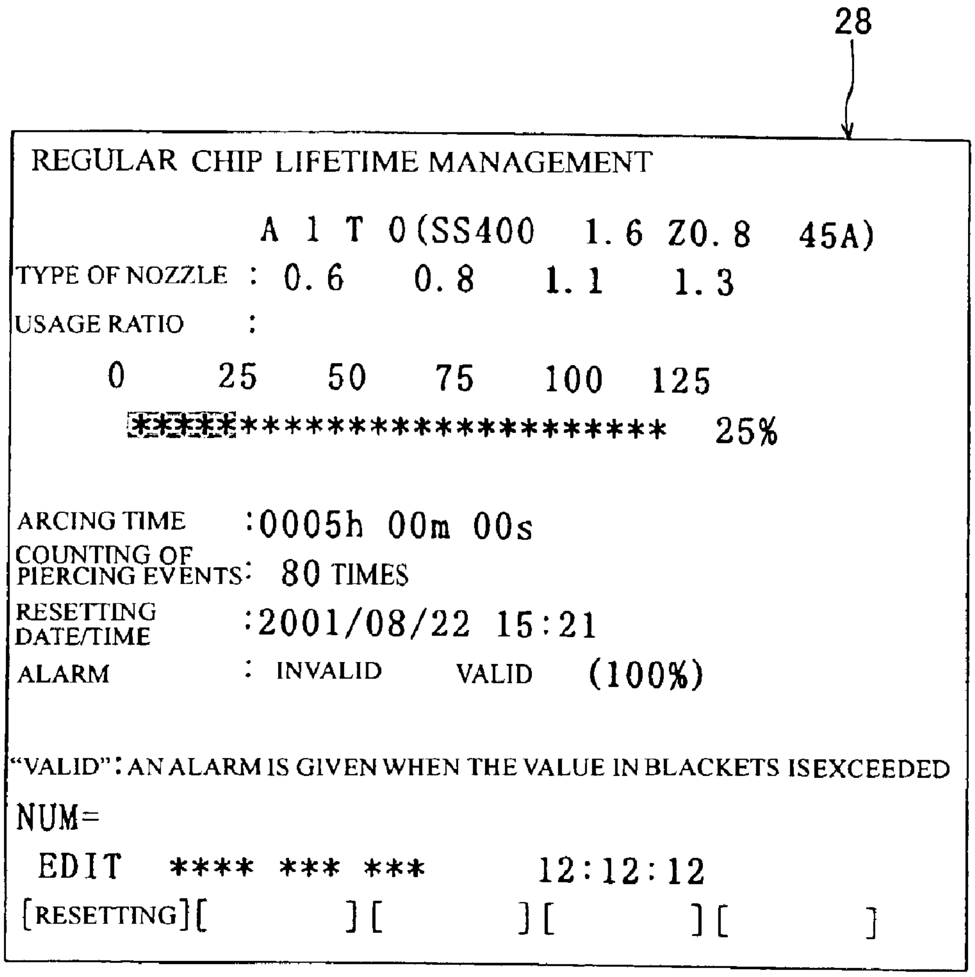
FIG. 4 is a view illustrating one example of the lifetime management screen displayed by a display unit.

A usage ratio U, which is the percentage of the consumption V to the lifetime consumption L (the amount consumed until the lifetime of a new consumable part i is expired), is displayed on a lifetime management screen such as shown in FIG. 4 in the display unit 28 (In the example shown in FIG. 4, it is indicated by symbolic and numerical representation that the usage ratio U is 25%). It should be noted that on this lifetime management screen, the type of the nozzle is displayed as the type of the consumable part i.

In this embodiment, when the relationship between the usage ratio U and the alarm display usage ratio D becomes $U \geqq D$, in other words, when the consumption V, lifetime consumption L and alarm display usage ratio D satisfy the relational expression $V \geqq L \times D$, an alarm is displayed in the display unit 28 (this corresponds to "the warning means" of the invention). In this way, the operator (supervisor) can be more reliably informed that the lifetime of the consumable part has been expired, whereby cutting defects or damage to the torch attributable to the operator's negligence can be prevented without fail.

Further, this embodiment is designed to stop the processing operation of the plasma arc cutting machine 1 under the control of the NC unit 15 upon completion of one cycle of processing if $V \geqq L \times D$ (this corresponds to "the operation stopping means" of the invention). With this arrangement, the steel plate W being processed is prevented from becoming defective without fail.

Turning now to the flow chart of FIG. 3, there will be explained the content of the processing operation performed according to the lifetime assessment program. This program is prepared based on an algorism for making an accurate lifetime assessment for each consumable part i when selectively using the plurality of consumable parts i ($i_1$–$i_4$) according to the thickness or the like of the steel plate W. In FIG. 3, symbol S represents a step.

Data on the type of the consumable part i and the processing condition for the consumable part i are obtained by reading the NC program into the memory 25 (S1), and based on the data, the type of the consumable part i to be used and the processing condition for this part i are determined (S2 to S3). At that time, if it is determined that the consumable part i to be used is i1 and the processing condition is j, the optimum arc current value (25[A], See Table 1) for the consumable part $i_1$ is set and the storage area 31 for the consumable part $i_1$ is selected to set the data stored in the data storing region associated with the processing condition j in the storage area 31 as an operand (S4).

Then, a plasma arc for use in cutting operation is generated between the electrode 16 and the steel plate W by starting up the power unit 19 (S5). After the output of the arc current is detected just after the ON signal indicative of turning ON of the power switch 22 has been input (S6), the data on Nj is transferred to a register of the CPU 23 and the value of Nj is incremented by one (+1) and the incremented data Nj is transferred to the original data storing region (S7). The time (ΔTj) elapsing since the processing is started until the processing is completed is measured by the timer 24 (S8 to S10). Then, this measured time ΔTj is integrated into the value of Tj which has been transferred to the register of the CPU 23 and the integrated Tj is transferred to the original data storing region (S11). Thereafter, the consumption V is calculated (S12) and the calculated consumption V is compared to the value L×D (the lifetime consumption×the alarm display usage ratio) (S13). If V≧L×D, an alarm is displayed in the display unit 28 (S14). On the other hand, if V<L×D, the next processing operation is performed (S15).

According to the invention, since an accurate lifetime assessment can be made for each of the plural consumable parts i ($i_1$–$i_4$), each consumable part i ($i_1$–$i_4$) can the effect of largely curtailing the running cost.

While a plasma arc cutting machine is employed as the plasma processing apparatus to which the invention is applied in the foregoing embodiment, the invention is also applicable to a plasma arc welding machine.

Although the foregoing embodiment has been discussed with a case where the selection from the storage areas associated with the plurality of consumable parts i ($i_1$–$i_4$) is automatically performed using the lifetime assessment program, the invention is not limited to this but may be modified. For instance, the selection from the storage areas associated with the plurality of consumable parts i ($i_1$–$i_4$) may be performed by the operator (supervisor) operating the selector keys 30.

In addition, although an electrode/nozzle set is treated as the consumable part in the lifetime management, lifetime management of either the electrode or the nozzle only may be carried out according to the concept of the invention.

Further, a computer network may be established for the NC unit 15 and the lifetime assessment program may be executed by a computer on the network.

What is claimed is:

1. A plasma processing apparatus, wherein a plasma arc is generated from a plasma torch using a plurality of interchangeable consumable parts, the apparatus comprising:

memory means for storing consumption data on each of the plurality of consumable parts;

selecting means for selecting the stored consumption data corresponding to a consumable part in use;

computing means for calculating consumption based on the consumption data selected by the selecting means; and displaying means for displaying the consumption calculated by the computing means, wherein said each of the consumable parts comprises at least one of an electrode and a nozzle.

2. The plasma processing apparatus according to claim 1, further comprising operation stopping means for stopping operation of the plasma processing apparatus upon completion of a processing operation if the consumption calculated by the computing means reaches a preset consumption value.

3. The plasma processing apparatus according to claim 1, further comprising warning means for sounding an alarm if the consumption calculated by the computing means reaches a preset consumption value.

4. The plasma processing apparatus according to claim 3, further comprising operation stopping means for stopping operation of the plasma processing apparatus upon completion of a processing operation if the consumption calculated by the computing means reaches a preset consumption value.

5. The plasma processing apparatus according to claim 1, wherein the consumption data includes at least one of a number of arcing events, an arcing time and an arc current.

6. The plasma processing apparatus according to claim 1, wherein the selecting means specifies one of the interchangeable consumable parts as a consumable part to be used by referring to processing data input to the memory means.

7. The plasma processing apparatus according to claim 2, wherein the consumption data includes at least one of a number of arcing events, an arcing time and an arc current.

8. The plasma processing apparatus according to claim 3, wherein the consumption data includes at least one of a number of arcing events, an arcing time and an arc current.

9. The plasma processing apparatus according to claim 4, wherein the consumption data includes at least one of a number of arcing events, an arcing time and an arc current.

10. The plasma processing apparatus according to claim 2, wherein the selecting means specifies one of the interchangeable consumable parts as a consumable part to be used by referring to processing data input to the memory means.

11. The plasma processing apparatus according to claim 3, wherein the selecting means specifies one of the interchangeable consumable parts as a consumable part to be used by referring to processing data input to the memory means.

12. The plasma processing apparatus according to claim 4, wherein the selecting means specifies one of the interchangeble consumable parts as a consumable part to be used by referring to processing data input to the memory means.

* * * * *